US010159962B2

(12) United States Patent
Yang et al.

(10) Patent No.: US 10,159,962 B2
(45) Date of Patent: Dec. 25, 2018

(54) CATALYSTS FOR OXIDATIVE SULFUR REMOVAL AND METHODS OF MAKING AND USING THEREOF (71) Applicant: INTRAMICRON, INC., Auburn, AL (US)

(72) Inventors: Hongyun Yang, Auburn, AL (US); Paul S. Dimick, Waverly, AL (US)

(73) Assignee: INTRAMICRON, INC., Auburn, AL (US)

( * ) Notice: Subject to any disclaimer, the term of this patent is extended or adjusted under 35 U.S.C. 154(b) by 410 days.

(21) Appl. No.: 14/373,198

(22) PCT Filed: Jan. 17, 2013

(86) PCT No.: PCT/US2013/021855
§ 371 (c)(1),
(2) Date: Jul. 18, 2014

(87) PCT Pub. No.: WO2013/180763
PCT Pub. Date: Dec. 5, 2013

(65) Prior Publication Data
US 2015/0027927 A1    Jan. 29, 2015

Related U.S. Application Data (60) Provisional application No. 61/587,902, filed on Jan. 18, 2012.

(51) Int. Cl.
B01J 27/125      (2006.01)
C10K 1/32        (2006.01)
B01D 53/86       (2006.01)
B01J 27/053      (2006.01)
C01B 17/04       (2006.01)
B01J 27/10       (2006.01)
B01J 27/128      (2006.01)
B01J 27/138      (2006.01)
C10G 25/00       (2006.01)
C10G 27/04       (2006.01)
C10G 27/08       (2006.01)
C10G 27/12       (2006.01)
C10G 27/14       (2006.01)
C10K 1/00        (2006.01)
C10K 1/34        (2006.01)

(52) U.S. Cl.
CPC ........ *B01J 27/125* (2013.01); *B01D 53/8612* (2013.01); *B01J 27/053* (2013.01); *B01J 27/10* (2013.01); *B01J 27/128* (2013.01); *B01J 27/138* (2013.01); *C01B 17/0465* (2013.01); *C10G 25/00* (2013.01); *C10G 27/04* (2013.01); *C10G 27/08* (2013.01); *C10G 27/12* (2013.01); *C10G 27/14* (2013.01); *C10K 1/004* (2013.01); *C10K 1/32* (2013.01); *C10K 1/34* (2013.01); *B01D 2251/102* (2013.01); *B01D 2251/104* (2013.01); *B01D 2251/106* (2013.01); *B01D 2251/11* (2013.01); *B01D 2251/508* (2013.01); *B01D 2253/1124* (2013.01); *B01D 2255/908* (2013.01); *B01D 2256/24* (2013.01); *B01D 2258/05* (2013.01)

(58) Field of Classification Search
None
See application file for complete search history.

(56) References Cited

U.S. PATENT DOCUMENTS

| 4,052,470 | A |   | 10/1977 | Nychka |               |
|-----------|---|---|---------|--------|---------------|
| 4,123,505 | A | * | 10/1978 | Williamson | C01B 17/167 |
|           |   |   |         |        | 423/228       |
| 4,188,309 | A |   | 2/1980  | Volker |               |
| 4,294,726 | A |   | 10/1981 | Bozon  |               |
| 4,310,497 | A | * | 1/1982  | Deschamps | C01B 17/508 |
|           |   |   |         |        | 423/230       |
| 4,399,112 | A | * | 8/1983  | Voirin | B01D 53/8603  |
|           |   |   |         |        | 423/230       |
| 4,474,739 | A |   | 10/1984 | Zackay |               |
| 4,793,976 | A | * | 12/1988 | Lee    | B01D 53/48    |
|           |   |   |         |        | 422/171       |
| 5,192,733 | A |   | 3/1993  | Mainz  |               |
| 5,604,173 | A |   | 2/1997  | Bouyanov |             |
| 5,607,657 | A |   | 3/1997  | Philippe |             |
| 5,609,845 | A | * | 3/1997  | Cimini | B01J 23/881   |
|           |   |   |         |        | 423/416       |
| 6,099,819 | A |   | 8/2000  | Srinivas |             |
| 7,060,233 | B1|   | 6/2006  | Srinivas |             |

(Continued)

FOREIGN PATENT DOCUMENTS

| CA | 231109  | * | 7/1975 |
|----|---------|---|--------|
| CA | 1337905 |   | 1/1996 |

(Continued)

OTHER PUBLICATIONS

Abatzoglou, et al.,"A review of biogas purification processes", Biofpr Sci., 3:42-71 (2009).

(Continued)

*Primary Examiner* — Sheng H Davis
(74) *Attorney, Agent, or Firm* — Pabst Patent Group LLP (57) ABSTRACT Catalysts for oxidative sulfur removal and methods of making and using thereof are described herein. The catalysts contain one or more reactive metal salts dispersed on one or more substrates. Suitable reactive metal salts include those salts containing multivariable metals having variable valence or oxidation states and having catalytic activity with sulfur compounds present in gaseous fuel streams. In some embodiments, the catalyst contains one or more compounds that function as an oxygen sponge under the reaction conditions for oxidative sulfur removal. The catalysts can be used to oxidatively remove sulfur-containing compounds from fuel streams, particularly gaseous fuel streams having high sulfur content. Due to the reduced catalyst cost, anticipated long catalyst life and reduced adsorbent consumption, the catalysts described herein are expected to provide a 20-60% reduction in annual desulfurization cost for biogas with sulfur contents ranges from 1000-5000 ppmv compared with the best adsorbent approach.

27 Claims, 6 Drawing Sheets

(56) References Cited

U.S. PATENT DOCUMENTS

| | | | |
|---|---|---|---|
| 2003/0129123 A1* | 7/2003 | Ramani | B01J 8/0221 |
| | | | 423/573.1 |
| 2004/0033192 A1 | 2/2004 | Nedez | |
| 2006/0051275 A1* | 3/2006 | Ramani | B01D 53/8612 |
| | | | 423/576.2 |
| 2011/0014114 A1 | 1/2011 | Schubert | |

FOREIGN PATENT DOCUMENTS

| | | |
|---|---|---|
| CN | 101190781 | * 11/2006 |
| DE | 4225957 | 4/1994 |

OTHER PUBLICATIONS

Baiker and Holstein, "Impregnation of alumina with copper chloride modeling of impregnation kinetics and internal copper profites", J Catalysis, 84(1):178-88 (1983).

Behl, "Electrospun nanofibrous metal oxides as regenerable adsorbents for desulfurization of biomass-derived syngas", IDEALS, 1-5 2011.

Bukhtiyarova, et al., "XPS study of the silica-supported Fe-containing catalysts for deep or partial H2S oxidation", J Mole Catalysis, 158:251-5 (2000).

Curtis, "Molybdenum/cobalt/sulfur clusters: Models and precursors for hydrodesulfurization (HDS) catalysts", Applied Organometallic Chem., 6:429-36 (1992).

Fayos, et al., "Study of supported copper chloride catalysts by electron paramagnetic resonance and X-ray diffraction", J Catalysis, 31(2):257-63 (1973).

Hutchings, et al., "Influence of chlorine poisoning of copper/alumina catalyst on the selective hydrogenation of crotonaldehyde", Catalysis Lttrs., 23(127-33 (1994).

Leofanti, et al., "Alumina-supported copper chloride 1. Characterizsation of reshly prepared catalyst", J Catalysis, 189(1):91-104 (2000a).

Leofanti, et al., "Alumina-supported copper chloride 2. Effects of aging and thermal treatments", J Catalysis, 188:105-16 (2000b).

Muddada, et al., "Quantification of copp[er phases, their reducibility and dispersion in doped-CuCl2/Al2O3 catalysts for ethylene oxychlorination", Dalton Trans, 39(36):8437-49 (2010).

Salavati-Niasari, et al., "Oxidation of cyclohexene with tert-butylhydroperoxide and hydrogen peroxide catalyzed by alumina-supported manganese(II) complexes", J Mole Catalysis, 186(101-7 (2002).

Yoo, et al., "Advanced De-Sox catalyst: Mixed solid solution spinels with cerium oxide", Applied Catalysis 3(29):169-89 (1992).

Zhang, et al., "Catalytic effects of metal oxides on the decomposition of potassium perchlorate", Thermochinica Acta, 278:119-27 (1996).

International Search Report and Written Opinion for PCT/US2013/021855 dated Oct. 25, 2013.

International Preliminary Report of Patentability for PCT/US2013/021855 dated May 22, 2014.

* cited by examiner

CATALYSTS FOR OXIDATIVE SULFUR REMOVAL AND METHODS OF MAKING AND USING THEREOF

STATEMENT REGARDING FEDERALLY SPONSORED RESEARCH OR DEVELOPMENT

This invention was made with U.S. Government Support from the following agency: U.S. Army, Grant No. ARMY-W56HZV-05-C0686. The U.S. Government has certain rights in the invention.

FIELD OF THE INVENTION

This invention is generally in the field of catalysts for oxidative sulfur removal, particularly catalysts for oxidative sulfur removal for gaseous fuel streams.

BACKGROUND OF THE INVENTION

Increasing fuel demands and decreasing fossil fuel reserves have renewed focus on previously neglected alternative and renewable fuel resources such as biogas, bitumen, and waste coal. Utilizing these resources, however, is technically and economically challenging due to high levels of contaminants such as sulfur. For instance, biogas desulfurization costs can be as high as 30% of its energy value, and standard biogas utilization systems generate hundreds of tons of sulfur-laden waste annually.

Biogas is the gas-phase product of the anaerobic digestion of organic matter, and it typically contains 50-75 vol. % methane ($CH_4$), 25-40 vol. % carbon dioxide ($CO_2$), 2-7 vol. % water vapor, and <2 vol. % oxygen and various contaminants including hydrogen sulfide ($H_2S$), mercaptans, ammonia ($NH_3$), halogenated species, and siloxanes. Biogas is commonly referred to by other names including swamp gas, landfill gas (LFG), and digester gas. When the composition of biogas is upgraded to a higher standard of purity, it is commonly referred to as renewable natural gas or biomethane.

Biogas is produced in significant amounts. According to the EPA, "the largest methane emissions come from the decomposition of wastes in landfills, ruminant digestion and manure management associated with domestic livestock, natural gas and oil systems, and coal mining. It is estimated that some 686.3 million $CO_2$-equivalent tons of methane were released in the United States in 2009 with landfills accounting for 117 million tons and waste water treatment plants accounting for 24.5 million tons. The total greenhouse gas emissions from biogas are approximately twice those numbers considering the large amount of $CO_2$ present in biogas as described above. Because of its large emission volume and the presence of toxic contaminants such as $H_2S$ and $NH_3$, biogas is a significant pollutant that is subject to various Federal regulations. Although biogas is environmentally problematic, it is also an important alternative energy source. With a Lower Heating Value (LHV) ranging from 25 to 37.5 MJ/kg depending on its methane concentration, biogas has been classified as a medium-BTU fuel.

Because biogas is generated from biomass and solid waste, it is considered to be a renewable carbon-neutral fuel. In the past 10 years, biogas has become an increasingly important fuel resource, particularly due to depleting petroleum reserves and increased awareness of greenhouse gas emissions. Biogas is typically used for combined industrial heat and power generation or as a feedstock for the chemical industry. Once biogas is converted to biomethane through the necessary purification steps, it is used as a natural gas replacement in applications ranging from transportation fuels to advanced electricity generation applications. Among these applications, power generation and injection to the natural gas grid are the most common.

According to the EPA's Landfill Methane Outreach Program (LMOP), there are more than 500 landfill gas projects in the United States. Two thirds of these projects produce electricity and generate 13 billion kW-hours of electricity annually and one third supply 100 billion cubic feet of landfill gas to direct end users and natural gas pipelines annually at an annual market value of S1.7 billion. In Europe, biogas plants provided 8346 kiloton oil equivalents of biogas with an estimated value of $5.9 billion in 2009. Currently the world market for biogas productions is $8 billion per year (BPY).

Most recently, directly producing energy from biogas using fuel cells has attracted significant research effort because of technological advances in fuel cells. High-temperature fuel cells, especially Solid Oxide Fuel Cells (SOFCs), are ideal for energy generation from biogas due to their high tolerance to $CO_2$ and contaminants such as sulfur, ammonia, and halogenated species which result in increased process simplicity. The fuel cell-based energy generation approach is advantageous because it can significantly reduce emissions while maximizing energy generation. Furthermore, with this approach, even small-scale landfills or waste water treatment plants can efficiently produce electricity. Besides its direct use as a renewable fuel, biogas is also a raw material for various gas-to-liquids (GTL) processes. GTL processes convert biogas to liquid fuels for easy storage and transportation.

The biogas applications described above are only viable if biogas contaminants are removed to below critical levels. This is of utmost importance for advanced power generation and fuel conversion processes where the contaminants can cause permanent damage to expensive system components. The most notorious biogas contaminants are sulfur species, which are primarily present as hydrogen sulfide ($H_2S$) and secondarily present as carbonyl sulfide (COS), dimethyl sulfide (DMS), and mercaptans. These species can be present at levels up to a few volume percent, and at these levels, even directly using biogas as a heating fuel for large scale applications is subject to environmental protection regulations.

The presence of sulfur at a typical range of 1000-5000 ppmv will poison the electrocatalysts inside most fuel cells and most GTL catalysts. Fuel cells typically require fuel gas with a sulfur content less than 0.5 ppm for molten carbonate fuel cells (MCFCs) and less than 2 ppm for SOFCs and GTL produced by Fischer Tropsch synthesis typically requires <1 ppm sulfur to keep catalysts from poisoning. Due to the high sulfur content of the feedstock and low sulfur threshold for these applications, desulfurization is a critical step and accounts for 30% of the energy value of biogas resources according to the DOE. Other common biogas contaminants such as ammonia ($NH_3$), siloxanes, and halogenated compounds also inhibit catalyst performance inside fuel cells and GTL units and cause corrosion and abrasion issues for the auxiliary components in various applications, especially compressed gas systems.

Various desulfurization technologies have been developed for different applications. According to the sulfur production scales, these technologies can be classified into three groups: large scale, medium scale and small scale.

For large-scale applications, amine scrubbing combined with the Claus reaction has been the most cost effective sulfur removal method. Most commercialized catalytic sulfur removal processes such as Shell's SulFerox® process and Merichem's LO-CAT® process have been used for medium-scale applications. These technologies convert $H_2S$ to elemental sulfur through liquid phase redox reactions using iron chelates as catalysts. Shell's Thiopaq®, similar to SulFerox®, is also a medium-scale process that oxidizes $H_2S$ to elemental sulfur with the assistance of bacteria. These processes, especially the LO-CAT® process, can remove sulfur from a stream containing a few hundred ppm $H_2S$ down to a few ppm $H_2S$. However, because of the high catalyst cost associated with these processes and the cumbersome solid-liquid separations that are required, these approaches are not suitable for small-scale applications.

For small-scale (<100 kg sulfur per day) processes, water scrubbing and sorbent scavengers are typically employed. At the lower end of small scale, less than 50 kg sulfur per day, the spent solids or liquids that contain $H_2S$ are directly disposed of to further reduce cost. All sulfur removal processes for biogas plants worldwide with a raw gas capacity of 10-13,000 $Nm^3$/hour are based on solid and liquid sorbents/scrubbers. A favorable standard biogas plant size is smaller, 500 kWe (estimated ~335 $Nm^3$/hour) due to the diversity of biogas resources. At this size, around 35 kg of sulfur must be removed per day assuming a 500 kWe system with 30% net efficiency and fed with biogas containing 50% methane and 3000 ppm of $H_2S$. Water scrubbing and disposable solid/liquids have been most economical for most of these types of plants.

Adsorption and absorption have been the primary technological choices for biogas purification, using systems such as metal oxides (i.e., iron sponge), metal oxide slurries, activated carbons, and impregnated active carbons.

These adsorbents, however, typically have relatively low sulfur capacities, less than 0.1 g of sulfur/g of adsorbent. At this capacity, the annual consumption of adsorbent will be ~125 metric tons or ~200 $m^3$ for the 500 kWe system. A similar approach that adds excessive iron salts to the digesters can result in low outlet sulfur concentrations from the digester so that no further desulfurization is needed. However, the annual iron chloride consumption at the recommended concentration (4 times the stoichiometric) is expected to reach 200 metric tons. This huge sorbent or chemical consumption makes these processes both chemical and labor intensive. Moreover, due to fluctuations in sulfur concentrations, extra sorbent has to be loaded for the worst possible cases, and most of these adsorbents are not regeneratable and have to be disposed of in accordance with state and/or federal regulations. For advanced biogas applications such as fuel cell based electricity production and GTL fuel production, other contaminants such as halogenated compounds and siloxanes have to be removed by adsorbents. All these factors lead to a large waste disposal burden for sulfur removal and biogas cleanup. An ironic aspect of the current desulfurization approaches is that the spent adsorbents will most likely be buried in landfills resulting in the production of high sulfur content biogas.

Recently membrane separation approaches have been explored for biogas purification. The membranes can provide a convenient method to separate both $CO_2$ and $H_2O$ from biogas by the use of a membrane. However, both approaches simply separate $H_2S$ from biogas stream and they still need downstream processes such as adsorption or a Claus reactor to process the sulfur species that are concentrated, particularly if $H_2S$ flaring is not allowed. Therefore, membranes are not a viable option for biogas desulfurization due to the limitations of adsorption and Claus processes.

Direct $H_2S$ oxidation is perhaps the most promising approach to meet the biogas desulfurization needs, due to its low fixed investment cost and very low operational cost. Oxidative sulfur removal (OSR) is based on a catalytic process to convert $H_2S$ into elemental sulfur by air at low to moderate temperatures (100-400° C.), as shown by Equation 1.

$$H_2S(g) + 0.5O_2(g) \rightarrow H_2O(g) + \tfrac{1}{8}S_8(g) \quad \text{Equation 1}$$

Some catalytic approaches developed for natural gas purification are able to oxidize $H_2S$ and mercaptans to elemental sulfur at 150 to 400° C. using niobium catalysts, activated carbon-based catalysts, iron catalysts, $TiO_2$ catalysts, Bi—Mo catalysts, and Vanadium catalysts.

Although direct $H_2S$ oxidation catalysts have been shown to be effective for geothermal waste gas and petroleum gas, such catalysts face significant challenges for biogas desulfurization. One major challenge is their short life in the presence of biogas. Significant deactivation of catalysts that functioned well during associated gas was observed during a 70-hour landfill gas testing.

Most of the catalysts and promoters evaluated for oxidative desulfurization are based on metal oxides of Cu, Fe, Mg, Mn, Mo, Nb and V. These metal oxides can react with $CO_2$ and halogenated compounds and form stable carbonates and halides such as $FeCl_2$, $FeCO_3$, $MgCO_3$, $MnCO_3$, $MoCl_2$, $CuCl_2$, $NbCl_4$, $NbCl_5$ and $VCl_4$. Among them, $NbCl_5$ and $VCl_4$ are highly volatile in OSR conditions. Some catalyst supports also suffer from sulfate formation at high temperatures. The formation of these species changes the structure of the catalysts and results in catalyst deactivation. Deactivation can also occur due to liquid sulfur formation and accumulation inside the catalyst pores.

The short catalyst life of the catalysts above significantly affects the economics of the process. With the current catalyst life and cost, the combination of OSR and adsorption is not competitive compared with the adsorbent approach using the best available commercial adsorbents. As a result, no commercial OSR processes for biogas desulfurization have been reported.

Another major challenge for current approaches is the formation of $SO_2$. Due to the presence of excessive amount of oxygen, which is typically necessary to achieve high $H_2S$ conversion, $SO_2$ is typically formed when the catalysts described above are employed. Moreover, $SO_2$ is more problematic than $H_2S$ because it leads to further sulfate formation on the catalyst active phase and sulfate formation inside the downstream gas clean-up units and even inside fuel cells, which are very difficult to regenerate or remove.

The major challenges discussed above significantly limit the commercialization of current catalysts and related processes. There exists a need for oxidative sulfur removal catalysts with longer catalyst life and high selectivity for elemental sulfur production biogas desulfurization.

Therefore, it is an object of the invention to provide catalysts for oxidative sulfur removal and methods of making and using thereof.

It is further object of the invention to provide catalysts for oxidative sulfur removal which can treat high sulfur content-containing fuel streams and have high contaminant tolerance.

SUMMARY OF THE INVENTION

Catalysts for oxidative sulfur removal and methods of making and using thereof are described herein. The catalysts contain one or more reactive metal salts dispersed on one or more substrates.

Suitable substrates include metal and metalloid oxides, mixed metal and metalloid oxides, activated carbon, and combinations thereof. The one or more substrate materials are generally present in an amount from about 80% to about 99% by weight of the catalyst, preferably from about 80% to about 95% by weight of the catalyst, more preferably from about 90% to about 95% by weight of the catalyst.

Suitable reactive metal salts include those salts containing multivariable metals having variable valence or oxidation states and having catalytic activity with sulfur compounds present in gaseous fuel streams. Examples of these classes of salts include, but are not limited to, chlorides of transition metals having multiple oxidation states, sulfates of transition metals having multiple oxidation states, and combinations thereof. Examples of species of these salts include, but are not limited to, $CuCl$, $MnCl_2$, $FeCl_2$, $FeSO_4$, $NiCl_2$, and $NiSO_4$. The reactive metals salts can be used alone or in combinations of one or more of the salts described above. The one or more reactive metal salts are present in an amount from about 1% to about 20% by weight of the catalyst, preferably from about 1% to about 10% by weight of the catalyst, more preferably from about 5% to about 10% by weight of the catalyst. In some embodiments, the amount of the one or more reactive salts is about 7% by weight of the catalyst.

In some embodiments, the catalyst contains one or more compounds that function as an oxygen sponge under the reaction conditions for oxidative sulfur removal. In particular embodiments, the oxygen sponge is one or more metal oxides. Examples of suitable metal oxides include, but are not limited to, lanthanide oxides, such as cerium oxide, alkaline earth oxides, such as magnesium oxide, and transition metal oxides, such as nickel oxide.

The catalysts can be formed into any shape such as powder, granules, pellets, slabs, rings, trilobes, extrudates, saddles, or monoliths. In some embodiments, the catalysts are entrapped within a microfibrous matrix. The microfibrous matrix can be formed from metals, alloys, polymers, ceramics, glass, carbon fiber, or combinations thereof.

The catalysts can be used to oxidatively remove sulfur-containing compounds from fuel streams, particularly gaseous fuel streams having high sulfur content. Examples of gaseous fuel streams include biogas, frac gas, gasified biomass, gasified coal/bitumen, gases from natural gas and oil wells, landfill gases, and gases from agricultural and livestock operations.

The catalysts described herein can be used to reduce the amount of inlet sulfur-content species by about 5% to about 10%, preferably from about 5% to about 20%, preferably from about 5% to about 50%, more preferably from about 5% to about 75%, most preferably from about 5% to about 95% after condensation of liquid elemental sulfur. In some embodiments, the amount of inlet sulfur-containing species is decreased at least 5%, 10%, 15%, 20%, 25%, 30%, 35%, 40%, 45%, 50%, 55%, 60%, 65%, 70%, 75%, 80%, 85%, 90%, 95%, 96%, 97%, 98%, or 99% after condensation of liquid elemental sulfur. If additional desulfurization is required, the outlet gas can be passed through a sorbent bed or other sulfur removal system to remove remaining sulfur-containing species.

The catalysts described herein generally exhibit a high single-pass conversion rate. For example, the catalysts exhibited a single pass conversion rate of 85-99% at 200° C. and oxygen to sulfur atomic ratio (O/S) of 1.2 in the presence of 0.4% $H_2S$-20% $H_2$-79.6% $CO_2$. Similar results were achieved using $CH_4$ instead of $CO_2$. Moreover, there was no $SO_2$ detected with any of the metal salt-based catalysts.

The catalysts described herein are active over a variety of temperatures. For example, the catalysts exhibit a percent conversion of 85-90% at 200° C., 80-85% at 180° C. and 90-95% at 220° C. at a O/S ratio of from about 1 to about 2, preferably about 1.2. In the 180-220° C. temperature range, no $SO_2$ was detected by GC-PFPD and elemental sulfur was the only product. The data shows that the catalyst results in efficient sulfur conversion even with significant temperature variations with little or no production of $SO_2$. The ideal operative temperature range is from about 160° C. to about 300° C., preferably from about 180° C. to about 250° C.

The catalysts described herein generate little or no $SO_2$ as a byproduct. The catalysts exhibited a sulfur conversion rate of 0.83-0.95 over O/S ratio of 1.2-2.4. At a ratio of 1.2, 20% above the stoichiometric amount, there was no $SO_2$ detected. After the O/S was increased to 2.4 (or 140% excess oxygen above the stoichiometric amount), $SO_2$ still was not detected. This suggests the catalyst has a very high selectivity for elemental sulfur formation and that $SO_2$ formation is negligible making these catalysts excellent candidates for fuel cell applications. In some embodiments, the amount of $SO_2$ generated is less than about 5%, 4%, 3%, 2%, 1%, 0.9%, 0.8%, 0.7%, 0.6%, 0.5%, 0.4%, 0.3%, 0.2%, or 0.1% at an oxygen to sulfur ratio of 1-100, 1-50, 1-25, 1-20, or 1-10.

The efficiency of the catalyst was also evaluated as a function of flow velocity. The same amount of catalyst was tested in varying flow velocity or gas hourly space velocity (GHSV) at a constant temperature of 200° C. The catalyst was initially tested at a GHSV of 1000 $h^{-1}$. The rate of sulfur conversion was maintained at 0.87-0.93 with the GHSV varying from 500 to 2000 $h^{-1}$. The data shows that the catalyst bed can tolerate significant variation in the flow rate.

The catalysts described herein exhibit one or more of the properties described above. The catalysts can exhibit any combination of the properties listed above.

Besides $H_2S$, the OSR catalysts described herein can also oxidize other sulfur species such as mercaptans and COS. The data show that the catalysts described herein convert a high percentage of mercaptans, such as butyl thiol. The catalyst reduced butanethiol from 500 ppmv to less than 100 ppmv.

The OSR catalysts described herein typically convert 85-95% of sulfur species in gaseous fuel streams, such as biogas, to elemental sulfur. The catalysts are formulated to improve catalyst life for desulfurization of high sulfur containing gaseous fuel streams. The catalysts are thermodynamically stable in the presence of contaminants such as $CO_2$, $NH_3$, halogenated compounds and the process temperatures Because the majority (85-95%) of sulfur is removed by OSR in the form of elemental sulfur, the adsorbent consumption and solid waste generation have decreased by a factor of 7-20 compared with traditional adsorbent approaches. Moreover, due to the relatively high operating temperatures of the catalysts, the OSR reaction takes place rapidly, with GHSVs typically in the range of 500-2000 $h^{-1}$. As a result, the OSR reactor is typically small, ca. 168-670 liters for a 500 kWe system. Therefore, the catalytic approach can significantly reduce the overall size, weight, and cost of the desulfurization process. The annual costs of the OSR and adsorbent combination are less than the cost of the best available commercial sulfur adsorbent with a high sulfur capacity of 0.35 g/g adsorbent.

Due to the reduced catalyst cost, anticipated long catalyst life and reduced adsorbent consumption, the catalysts described herein are expected to provide a 20-60% reduction in annual desulfurization cost for biogas with sulfur contents ranges from 1000-5000 ppmv compared with the best adsorbent approach.

DETAILED DESCRIPTION OF THE INVENTION

I. Definitions

"Oxidative sulfur removal", as used herein, generally means the oxidation of sulfur-containing compounds to elemental sulfur. In particular embodiment, sulfur-containing compounds are oxidized to elemental sulfur with little or no generation of sulfur dioxide.

"Catalyst", as used herein, refers to one or more substrates in combination with one or more compounds or materials that have catalytic activity.

"Substrate", as used herein, refers to one or more support materials that may be non-reactive when contacted by sulfur containing fuel streams and oxygen-containing gases. Some reaction of the substrate material can be tolerated provided it does not adversely affect the oxidative sulfur removal reaction.

"Reactive metal salts", as used herein, generally refers to metal salts responsible for the catalytic activity with sulfur-containing species found in the fuel stream.

"Physically absorbed", as used herein, generally means that the one or more reactive metal salts are physically associated with (e.g., physically adsorbed to), not chemically bound to, the one or more substrates.

"Oxygen sponge", as used herein, refers to a compound or compounds that facilitate oxygen adsorption, transport, and/or reaction.

"Impregnating", as used herein, generally means the process of placing the reactive metal salts, oxygen sponges, and/or their precursors on and/or in the supports. In some embodiments, this is done by allowing the substrate to interact with these components, typically in a solution. The impregnation step can be followed by thermal treatments to generate the catalyst in its final form.

"Fluid", as used herein, generally means a substance that has no fixed shape and yields easily to external pressure, such as a liquid or gas. The fluid fuel stream can be in the form of a liquid or gas.

"Gaseous fuel stream", as used herein, generally refers to a fuel stream that is in the form of a gas.

"Oxygen-containing gas(es)", as used herein, generally refers to oxygen, oxygen-enriched gases, mixtures of gases containing elemental oxygen, such as air, or gases containing oxygen-containing molecules, such as ozone ($O_3$), hydrogen peroxides ($H_2O_2$), $SO_2$.

"High sulfur content", as used herein, generally means fuel streams, such as gaseous fuel streams, which contain sulfur-containing compounds in an amount from at least about 300 ppm to about 40,000 ppm.

"Stable", as used herein, generally means the catalysts are thermally stable and chemically stable. "Thermally stable", as used herein, means the catalysts can oxidize sulfur-containing compounds at 200-300° C. with little or no decomposition of the catalyst. "Chemically stable", as used herein, generally means that the catalysts will not react with $H_2$, $CO_2$, and halogenated compounds, and will not react with ammonia at its typical concentration found in gaseous fuel sources (e.g., <1%) at 200-300° C. or will react to such a small degree that it does not effective catalytic efficiency.

II. Catalysts

A. Substrate

The catalysts described herein contain one or more substrates. Suitable substrates include activated carbon, metal or metalloid oxides, and combinations thereof. In some embodiments, the substrate is two or more metal or metalloid oxides, herein referred to as mixed metal oxides. Suitable metals include transition metals such as titanium, and metalloids, such as silicon and aluminum. Exemplary metal and metalloid oxides include, but are not limited to, aluminum oxide ($Al_2O_3$), titanium dioxide ($TiO_2$), silicon dioxide ($SiO_2$), ceria, and combinations thereof.

The one or more substrate materials are generally present in an amount from about 80% to about 99% by weight of the catalyst, preferably from about 80% to about 95% by weight of the catalyst, more preferably from about 90% to about 95% by weight of the composition.

In order to load sufficient amounts of the metal salts on the substrates, substrates with large pore volume are preferred. Typical pore volume is around 0.2-1.2 cc/g of support. Typical medium pore diameter is in the range of 10-200 Å. High surface area helps to facilitate the oxidation reaction. Typical surface area is in the range of 40-600 m$^2$/g of support.

Particle size is typically less than 3 mm due to slow mass transfer of sulfur vapor inside the catalyst particles. Minimal particle size is selected such that significant pressures drops are avoided. Accordingly, the particle size is typically in the range of 14-20 mesh (0.8-1.4 mm).

B. Reactive Metal Salts

The catalysts described herein contain one or more reactive metal salts which are primarily responsible for the catalytic activity of the catalyst. In some embodiments, the metal salts are multivariable metals having variable valence or oxidation states and having catalytic activity with sulfur compounds in the fuel stream. Examples of these classes of salts include, but are not limited to, chlorides of transition metals having multiple oxidation states, sulfates of transition metals having multiple oxidation states, and combinations thereof. Examples of species of these salts include, but are not limited to, $CuCl$, $MnCl_2$, $MnSO_4$, and $FeSO_4/Fe_2(SO_4)_3$.

For the reactive metal salts described herein, it is preferred that (1) the metal ions are in the lowest or a lower oxidation state; (2) the metal ions can be oxidized to the next higher oxidation state by oxygen in the temperature range of 100-300° C.; (3) the metal ions at higher oxidation states can oxidize $H_2S$ to elemental sulfur; (4) the cations will not be oxidized by the metal ions at the next higher oxidization state; and (5) the salts must be thermally and chemically stable under various operation conditions.

For example, $CuCl_2$ is not a suitable reactive metal salt. Cu is in its highest oxidization state, therefore, it can only be reduced to CuCl with generation of hydrochloric acid (HCl). HCl, however, adversely affects the $H_2S$ adsorption on the surface of the catalyst. Moreover, HCl is also poisonous and corrosive to most catalysts and reactor equipment, such as pipings. For the same reason, other metal chloride salts, such as $FeCl_3$, are not suitable catalysts.

In other embodiments, the reactive metal salts are salts of alkaline and alkali earth metals, particularly those metals after the third row in the periodic table, such as bromide and iodide salts. Examples include, but are not limited to, KI, $CaI_2$, and combinations thereof. For salts such as $MnI_2$ and $MnBr_2$, Mn cannot be oxidized to its highest oxidization state without oxidizing I$^-$ and perhaps Br$^-$. As a result, elemental iodine and bromine are generated as intermediates. These intermediates can oxidize $H_2S$ and generate elemental sulfur. Therefore, salts which, upon oxidation, generate elemental halogen, e.g., iodine and/or bromine, which in turns oxidizes $H_2S$ to elemental sulfur may also be used.

The reactive metals salts can be used alone or in combinations of one or more of the salts described above. The one or more reactive metal salts are present in an amount from about 1% to about 20% by weight of the catalyst, preferably from about 1% to about 10% by weight of the catalyst, more preferably from about 5% to about 10% by weight of the catalyst. In some embodiments, the amount of the one or more reactive salts is about 7% by weight of the catalyst.

C. Oxygen Sponge

In some embodiments, the catalyst contains one or more compounds that function as an oxygen sponge under the reaction conditions for oxidative sulfur removal. In some embodiments, the oxygen sponge is one or more metal oxides. Examples of suitable metal oxides include, but are not limited to, lanthanide oxides, such as cerium oxide and alkaline earth oxides, such as magnesium oxide.

D. Form of the Catalyst

The catalysts described herein can be prepared in any form. Exemplary forms include, but are not limited to, powder, granules, pellets, slabs, rings, trilobes, saddles, extrudates, or monoliths.

III. Methods of Making the Catalysts

The catalysts are prepared by dispersing the one or more reactive metal salts on the one or more substrates. The metal salts have weak interactions with the substrates compared to similar catalysts. For example, the metal salts in the catalysts described herein can be easily removed by dissolving the catalyst in aqueous solution. The one or more reactive metal salts are physically adsorbed to the substrate, not chemically bound to the substrate.

The catalysts are prepared by impregnating the one or more reactive metal salts into the substrate. A typical impregnation can be carried out by uniformly contacting an impregnation salt solution onto the support particles while stirring. Multiple reactive salts can added in one impregnation step or in multiple steps.

Once the impregnation step is complete, the catalyst is dried. Methods of drying include passing air through the catalyst at an elevated temperature, e.g., ~200° C., for quick drying or passing dry gas through the catalyst at room temperature for an extended period of time to remove crystallized water resulting from impregnation. In contrast, catalysts having a similar composition, such as catalysts for the Deacon process, require a high-temperature calcination (500-800° C.) step, which enables the formation of strong chemical bonds between active catalysts and the metal oxide substrate.

IV. Methods of Oxidative Sulfur Removal

Catalysts containing one or more reactive metal salts impregnated in one or more substrates are described herein. The catalysts can be used to selectively oxidize sulfur-containing compounds, such as $H_2S$, to elemental sulfur according to Equation 1.

$$H_2S(g) + 0.5O_2(g) \rightarrow H_2O(g) + \tfrac{1}{8}S_8(g)$$

Figure 10:
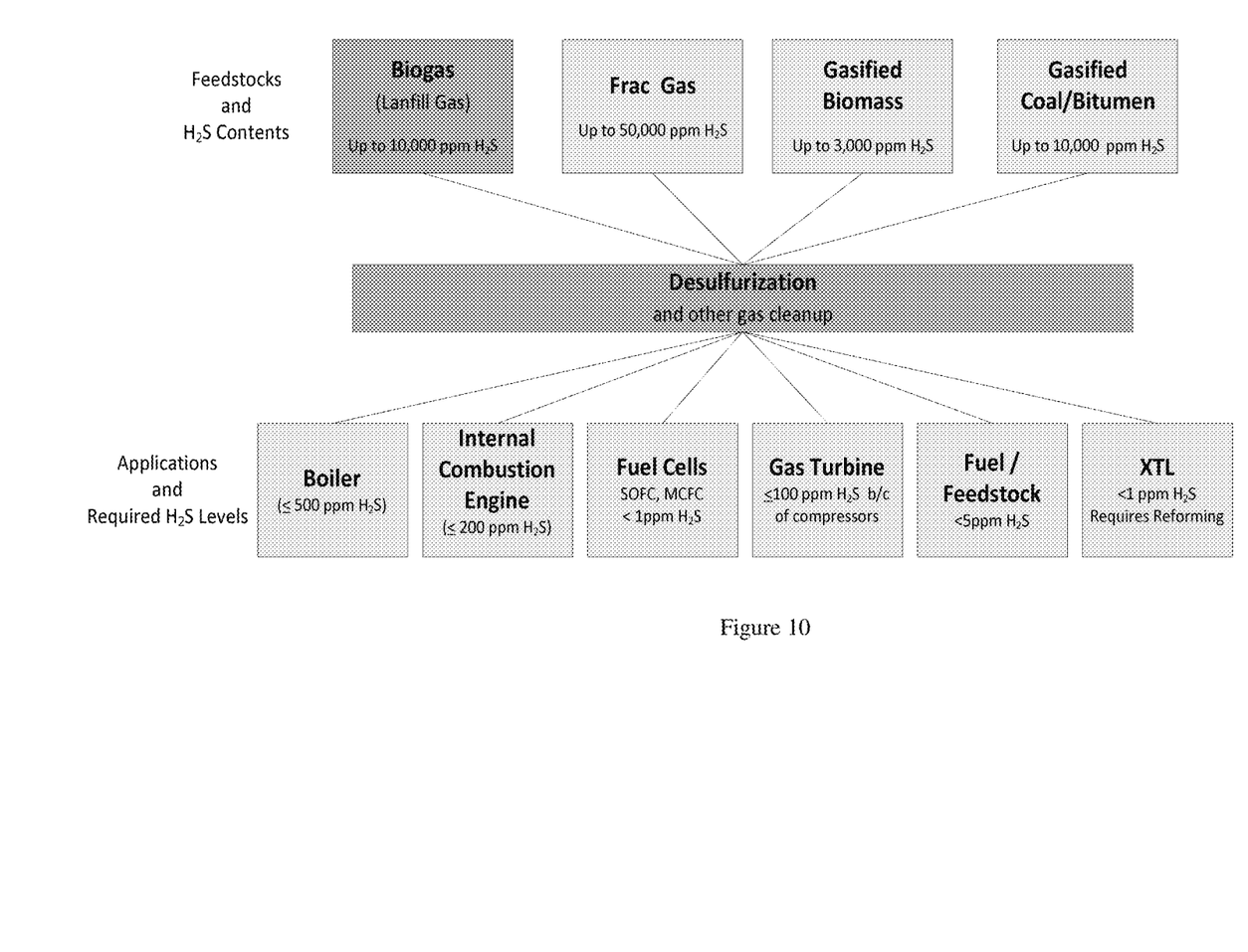
FIG. 10 is a schematic describing the sulfur content of various gaseous fuel streams and the sulfur requirements for various applications.

The catalyst described herein can be used to treat a variety of fuel streams, particularly gaseous fuel streams, such as biogas, frac gas, gasified biomass, and gasified coal/bitumen. Many of the gaseous fuel streams have a high sulfur content. In order to be suitable for use as transportation fuels and/or power generation, the sulfur content must be significantly decreased. FIG. 10 describes the sulfur content of various gaseous fuel streams and the sulfur requirements for various applications.

The catalysts described herein can be used to reduce the amount of inlet sulfur-content species by about 5% to about 10%, preferably from about 5% to about 20%, preferably from about 5% to about 50%, more preferably from about 5% to about 75%, most preferably from about 5% to about 95% after condensation of liquid elemental sulfur. In some embodiments, the amount of inlet sulfur-containing species is decreased at least 5%, 10%, 15%, 20%, 25%, 30%, 35%, 40%, 45%, 50%, 55%, 60%, 65%, 70%, 75%, 80%, 85%, 90%, 95%, 96%, 97%, 98%, or 99% after condensation of liquid elemental sulfur. If additional desulfurization is required, the outlet gas can be passed through a sorbent bed to remove remaining sulfur-containing species.

In a typical oxidative sulfur removal system, the system contains a catalysts bed containing one or more of the catalysts described herein; a condensation unit which condenses the elemental sulfur in the gaseous fuel stream into liquid elemental sulfur, and optionally a sorbent unit or scrubber which can remove more of the sulfur-containing compounds if necessary. Commercially available sorbents/systems, such as ZnO, activated carbon, water scrubbing, etc. are suitable for the removal of the sulfur-containing compounds.

In some cases, liquid sulfur can accumulate inside the pores of the catalysts. This accumulation can cause severe deactivation of the catalyst. In these cases, periodically increasing the temperature to a higher level will remove the liquid sulfur from the pores while maintaining the reaction at ideal conditions. This approach can extend the life of the catalyst.

The catalysts can be used in combination with oxygen or an oxygen-containing gas. Suitable oxygen-containing gases include, but are not limited to, oxygen, sulfur dioxide, air, ozone, hydrogen peroxide, or combinations thereof. The concentration of oxygen or oxygen-containing gas can vary. In some embodiments, the atomic ratio of oxygen to sulfur is from about 0.5 to about 100, preferably from about 1.0 to about 100, more preferably from about 1.0 to about 25, most preferably from about 1.0 to about 5. In particular embodiments, the atomic ratio of oxygen to sulfur is from about 1.0 to about 4.0.

The catalysts described herein generally maintain a very high single-pass conversion rate. For example, the catalysts exhibited a single pass conversion rate of 85-99% at 200° C. and an O/S of 1.2 in the presence of 0.4% $H_2S$-20% $H_2$-79.6% $CO_2$. Similar results were achieved using $CH_4$ instead of $CO_2$. Moreover, there was no $SO_2$ detected with any of the metal salt-based catalysts.

The catalysts described herein are active over a variety of temperatures. For example, the catalysts exhibit a percent conversion of 85-90% at 200° C., 80-85% at 180° C. and 90-95% at 220° at an O/S of from about 1 to about 2, preferably about 1.2. In the 180-220° C. temperature range, no $SO_2$ was detected by GC-PFPD and elemental sulfur was the only product. The data shows that the catalyst results in efficient sulfur conversion even with significant temperature variations with little or no production of $SO_2$. The ideal operative temperature range is from about 160° C. to about 300° C., preferably from about 180° C. to about 250° C.

Since the oxidative sulfur removal (OSR) catalysts uses oxygen as the oxidizer, the catalysts have extremely high equilibrium for each reaction. This is a significant advantage over Claus reaction catalysts that rely on $SO_2$ as the oxidizer and suffer from equilibrium limitations.

Figure 1:
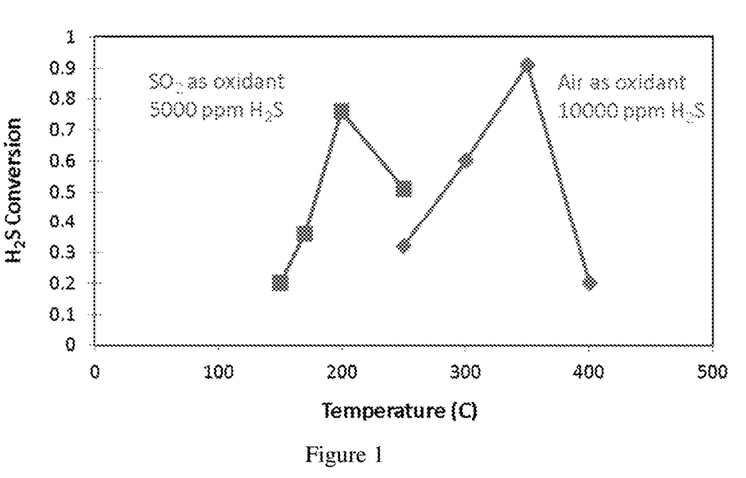
FIG. 1 is a graph showing the percent conversion of $H_2S$ as a function of temperature (° C.) using gamma-alumina as catalyst in the presence of oxygen and sulfur dioxide. The percent conversion was performed with an $H_2S$—$H_2$ mixture at GHSV of 5000 hr$^{-1}$. The O/S was 1.5.

The OSR catalysts described herein use the same catalyst supports used in Claus reaction catalysts. However, Claus reaction catalysts do not contain reactive metal salts. Therefore, the Clause reaction requires much higher temperatures (300-400° C.) to activate the reaction (see FIG. 1). Under these conditions, the reaction can reach a conversion as high as 90% at 350° C. at a high O/S ratio of 1.5; however, a significant amount of $H_2S$ is converted to $SO_2$. $SO_2$ is highly corrosive and a health and environmental hazard in its own right. Production of significant amounts of $SO_2$ can also damage sensitive components in fuel cells and other reactors.

Other oxidative desulfurization processes also utilize very high oxygen to atomic sulfur (O/S) ratios in order to achieve high sulfur conversions. The excess oxygen reacts with sulfur species to form $SO_2$, a troublesome contaminant on the anode side due to the formation of stable metal sulfates. In some embodiments, the amount of $SO_2$ generated using the catalysts described herein is less than about 5%, 4%, 3%, 2%, 1%, 0.9%, 0.8%, 0.7%, 0.6%, 0.5%, 0.4%, 0.3%, 0.2%, or 0.1% at an oxygen to sulfur ratio of 1-100, 1-50, 1-25, 1-20, or 1-10.

The catalysts described herein exhibited a sulfur conversion rate of 0.83-0.95 over O/S ratio of 1.2-2.4. At a ratio of 1.2, 20% above the stoichiometric amount, there was no $SO_2$ detected. After the O/S was increased to 2.4 (or 140% excess oxygen above the stoichiometric amount), $SO_2$ still was not detected. This suggests the catalyst has a very high selectivity to elemental sulfur formation and that $SO_2$ formation is negligible making these catalysts excellent candidates for fuel cell applications.

Besides $H_2S$, the OSR catalysts described herein can also oxidize other sulfur species such as mercaptans and COS. Several metal salts catalysts were tested for the oxidation of butyl thiol and COS. The oxidation of butyl thiol and COS is shown in reactions 2 and 3. Both reactions have high equilibrium constants: $7.39 \times 10^{20}$ for n-butyl thiol and $2.01 \times 10^{23}$ for COS at 200° C.

$$R\text{—}SH(g)+0.5O_2(g)=R\text{—}OH(g)+\tfrac{1}{8}S_8(g) \qquad (2)$$

$$COS(g)+0.5O_2(g)=CO_2(g)+\tfrac{1}{8}S_8(g) \qquad (3)$$

The test results show that the catalysts described herein convert a high percentage of mercaptans, such as butyl thiol. The catalyst reduced butanethiol from 500 ppmv to less than 100 ppmv.

The catalysts were less active for COS; the conversion remained at ~60%. This suggests that the catalysts are most active against molecules containing one or more —SH groups. In cases of high concentrations of COS a COS hydrolysis reactor can be used prior to the gas entering the catalyst bed. Since most gas mixtures for fuel cells, such as natural gas and reformate, contain extremely low levels of COS, the catalysts described herein can be used to remove high concentrations sulfur compounds from gas streams for fuel cell applications. Moreover, the sulfur conversion at various O/S ratios maintained stable. The sulfur conversion was in the range of 0.83-0.95. The O/S ratio appeared to have no significant effects on the sulfur conversion rate.

The efficiency of the catalyst was also evaluated as a function of flow velocity. The same amount of catalyst was tested in a varying flow velocity or gas hourly space velocity (GHSV) at a constant temperature of 200° C. The catalyst was initially tested at a GHSV of 1000 $h^{-1}$. The rate of sulfur conversion was maintained at 0.87-0.93 with the GHSV varying from 500 to 2000 $h^{-1}$. The data shows that the catalyst bed can tolerate significant variation in the flow rate.

The OSR catalysts described herein typically convert 85-95% of sulfur species in gaseous fuel streams, such as biogas, to elemental sulfur. The catalysts are formulated to improve catalyst life for desulfurization of high sulfur containing gaseous fuel streams. The catalysts are thermodynamically and chemically stable in the presence of contaminants such as $CO_2$, $NH_3$, halogenated compounds and the process temperatures, according to analyses performed with HSC Chemistry v7.0.

Because the majority (85-95%) of sulfur is removed by OSR in the form of elemental sulfur, the adsorbent consumption and solid waste generation have decreased by a factor of 7-20 compared with traditional adsorbent approaches. Moreover, due to the relatively high operating temperatures of the catalysts, the OSR reaction takes place rapidly, with GHSVs typically in the range of 500-2000 $h^{-1}$. As a result, the OSR reactor is typically small, ca. 168-670 liters for a 500 kWe system. Therefore, the catalytic approach can significantly reduce the overall size, weight, and cost of the desulfurization process. The annual costs of the OSR and adsorbent combination are less than the cost of the best available commercial sulfur adsorbent with a high sulfur capacity of 0.35 g/g adsorbent.

The catalysts described herein exhibit one or more of the properties described above. The catalysts can exhibit any combination of the properties listed above.

Due to the reduced catalyst cost, anticipated long catalyst life and reduced adsorbent consumption, the catalysts described herein are expected to provide a 20-60% reduction in annual desulfurization cost for biogas with sulfur contents ranges from 1000-5000 ppmv compared with the best adsorbent approach.

EXAMPLES

Example 1. Preparation of Oxidative Sulfur Removal (OSR) Catalysts 10 grams of $Al_2O_3$ with pore volume of 0.6 cc/g was impregnated with 6 ml of cerium nitrate solution (0.5 mol/L). The impregnated particles were dried in a flowing air stream (100 ml/min) for 8 hours. The particles were then calcined in a furnace at 500° C. in air. After the supported particles were cooled to room temperature, they are impregnated again with 6 ml of a $FeSO_4$ solution (1 mol/L). The impregnated particles were dried in a flowing air stream at room temperature. After the particle weight dropped to 12.5 grams, the catalyst particles were dried at 200° C. for 30 minute in a flowing air stream. The drying temperature can be the same temperature used for the OSR reaction.

Figure 2:
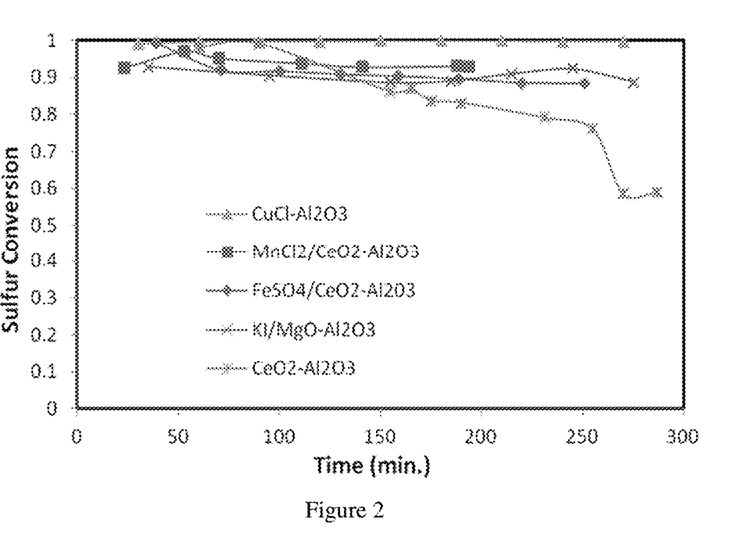
FIG. 2 is a graph showing the percent conversion of $H_2S$ as a function of time (minutes) for various catalysts. The rate of conversation was measured at 200° C. and O/S of 1.2 in the presence of 0.4% $H_2S$-20% $H_2$-79.6% $CO_2$ at a GHSV of 1000 h$^{-1}$.

Example 2. Oxidative Sulfur Removal Performance of Metal Salt-Based OSR Catalysts The following catalysts were evaluated for oxidative sulfur removal: (1) $CuCl$—$Al_2O_3$; (2) $MnCl_2/CeO_2$—$Al_2O_3$; (3) $FeSO_4/CeO_2$—$Al_2O_3$; (4) $KI/MgO$—$Al_2O_3$; and (5) $CeO_2$—$Al_2O_3$. The catalysts were tested at 200° C. at an O/S ratio of 0.6 in the presence of 0.4% $H_2S$-20% $H_2$-79.6% $CO_2$ at a GHSV of 1000 $h^{-1}$. The results are shown in FIG. 2.

All of the catalysts, with the exception of catalyst (5), showed greater than 85% conversion of $H_2S$ over a period of almost 5 hours. Catalyst (5), $CeO_2$—$Al_2O_3$, which lacks a reactive metal salt, showed signs of deactivation at starting at less than 100 minutes. This parallels reports in the literature that mixed metal oxide catalysts are prone to deactivation after a short period of time.

Example 3. Desulfurization Activity for Sulfur-Containing Species Other than $H_2S$ The catalyst $KI/MgO$—$Al_2O_3$ was evaluated for sulfur-containing compounds other than $H_2S$. The catalyst was tested at 200° C. at an O/S ratio of 1.2 in the presence of (1) 500 ppmv butanethiol-methane and (2) 1000 ppmv COS—$N_2$ at a GHSV of 1000 $h^{-1}$. The results are shown in FIG. 3.

Figure 3:
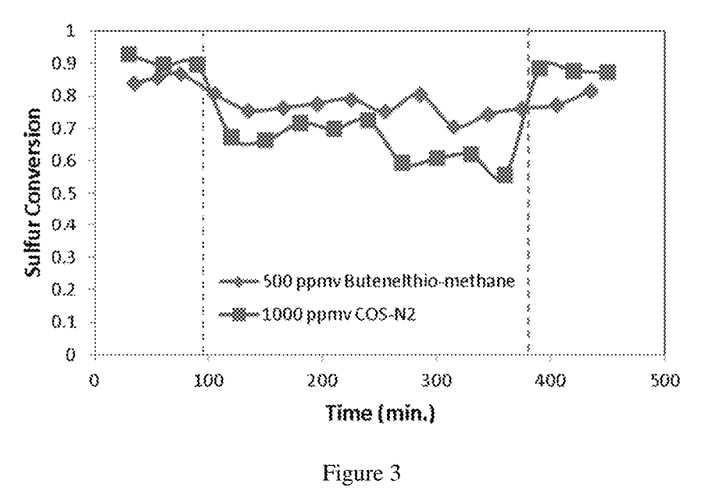
FIG. 3 is a graph showing the percent conversion of sulfur compounds COS and butyl thiol as a function of time (minutes) for KI/MgO—$Al_2O_3$ at 200° C. and GHSV of 1000 hr$^{-1}$ and O/S of 1.2.

FIG. 3 shows that the catalysts convert a high percentage of mercaptans, such as butyl thiol. The catalyst reduced butanethiol from 500 ppmv to less than 100 ppmv. The catalyst was less active for COS; the conversion remained at ~60%. This suggests that the catalysts are most active against containing —SH group. Moreover, the sulfur conversion at various O/S ratios maintained stable. The sulfur conversion was in the range of 0.83-0.95. The O/S ratio appeared to have no significant effects on the sulfur conversion rate.

Example 4. Sulfur Conversion as a Function of O/S Ratio

Figure 4:
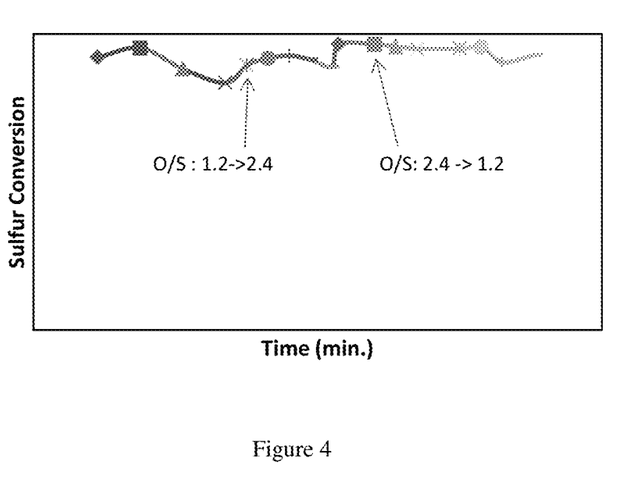
FIG. 4 is a graph showing the rate of conversion of sulfur compounds as a function of time (minutes) for KI/MgO—$Al_2O_3$ at different O/S at 200° C. with 4000 ppmv $H_2S$ in $H_2$—$CO_2$ mixture at GHSV of 1000 h$^{-1}$.

The catalyst $KI/MgO$—$Al_2O_3$ was evaluated for percent sulfur conversion as a function of O/S ratio. The catalyst was tested at 200° C. with 4000 ppmv $H_2S$ in $H_2$—$CO_2$ at a GHSV of 1000 $h^{-1}$. The O/S ratio was varied from 1.2 to 2.4 and from 2.4 to 1.2. The results are shown in FIG. 4.

The catalysts exhibited a sulfur conversion rate of 0.83-0.95 over an O/S ratio 1.2-2.4. At a ratio of 1.2, 20% above the stoichiometric amount, there was no $SO_2$ detected. After the O/S was increased to 2.4 (or 140% excess oxygen above the stoichiometric amount), $SO_2$ still was not detected. This suggests the catalyst has a very high selectivity to elemental sulfur formation and that $SO_2$ formation is negligible.

Example 5. Sulfur Conversion as a Function of Temperature

Figure 5:
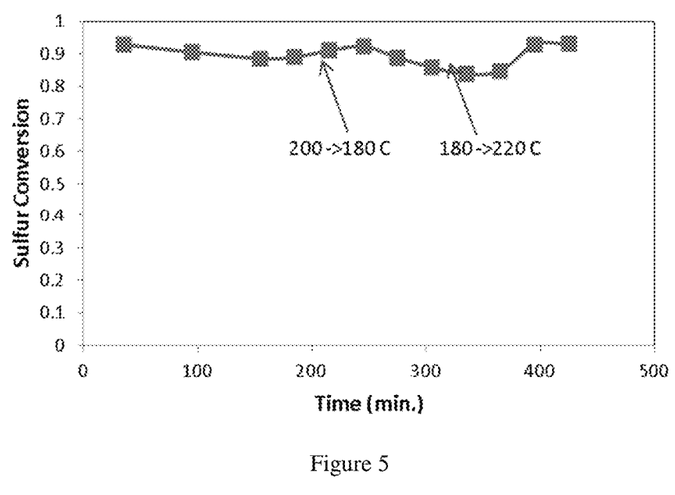
FIG. 5 is a graph showing the rate of conversion of sulfur compounds as a function of time (minutes) for KI/MgO—$Al_2O_3$ at different temperatures. The catalyst was tested initially at 200° C. with 4000 ppmv $H_2S$ in $H_2$—$N_2$ mixture at a GHSV of 1000 hr$^{-1}$.

The $KI/MgO$—$Al_2O_3$ catalyst was evaluated for percent sulfur conversion as a function of temperature. The catalyst was tested with 4000 ppmv $H_2S$ in $H_2$—$N_2$ at a GHSV of 1000 $hr^{-1}$. The initial temperature was 200° C. The temperature was lowered to 180° C. and then raised to 220° C. The results are shown in FIG. 5.

At 200° C., the catalyst had a sulfur conversion rate of 0.88-0.9. At a lower temperature, 180° C., the sulfur conversion dropped slightly to 0.83; at a higher temperature, 220° C., the conversion increased to 0.93. In the 180-220° C. temperature range, no $SO_2$ was detected by GC-PFPD and elemental sulfur was the only product. The data shows that the catalyst results in efficient sulfur conversion even with significant temperature variations with little or no production of $SO_2$.

Example 6. Sulfur Conversion as a Function of Flow Rate

Figure 6:
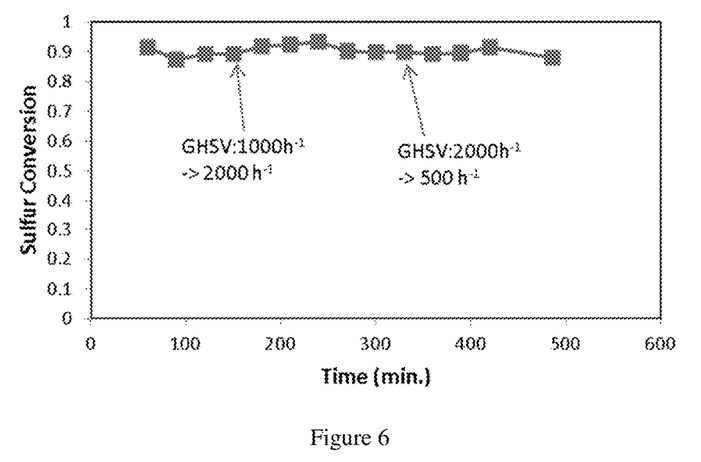
FIG. 6 is a graph showing the rate of conversion of sulfur compounds as a function of time (minutes) for KI/MgO—$Al_2O_3$ at different GHSVs. The test was conducted at 200° C. with 4000 ppmv $H_2S$ in $H_2$—$CO_2$ mixture.

The $KI/MgO$—$Al_2O_3$ catalyst was evaluated for percent sulfur conversion as a function of flow rate (GHSV). The catalyst was tested at 200° C. with 4000 ppmv $H_2S$ in $H_2$—$N_2$. The GHSV was 1000 $hr^{-1}$. The GHSV was increased to 2000 $hr^{-1}$ and then reduced to 500 $hr^{-1}$. The results are shown in FIG. 6.

The rate of sulfur conversion was maintained at 0.87-0.93 with the GHSV varying from 500 to 2000 $h^{-1}$. The data shows that the catalyst bed can tolerate significant variation in the flow rate.

Example 7. Iron (II) Sulfate ($FeSO_4$) Based Catalyst

Figure 7:
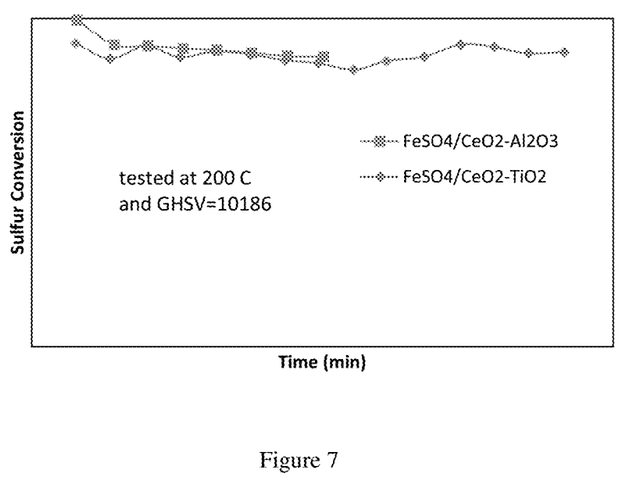
FIG. 7 is a graph showing $H_2S$ conversion for $FeSO_4$/$CeO_2$—$TiO_2$ at high GHSV of 10186 hr$^{-1}$. The catalyst was tested at 200° C. with 4000 ppmv $H_2S$ in $H_2$—$CO_2$—$N_2$ mixture.

An iron sulfate-based catalyst was supported on $CeO_2$—$TiO_2$. The catalyst was evaluated for percent sulfur conversion at 200° C. and a GHSV of 10186 h⁻¹. The challenge gas was 4000 ppmv $H_2S$ in $H_2$—$CO_2$—$N_2$. The results are shown in FIG. 7.

The sulfur conversion was maintained at 0.84-0.93 and the desulfurization performance was very stable at this GHSV, which is 10 times higher than the GHSV used in other studies. This result suggests that the OSR catalyst can be further reduced.

Example 8. Iron (II) Chloride-Based Catalyst

Figure 8:
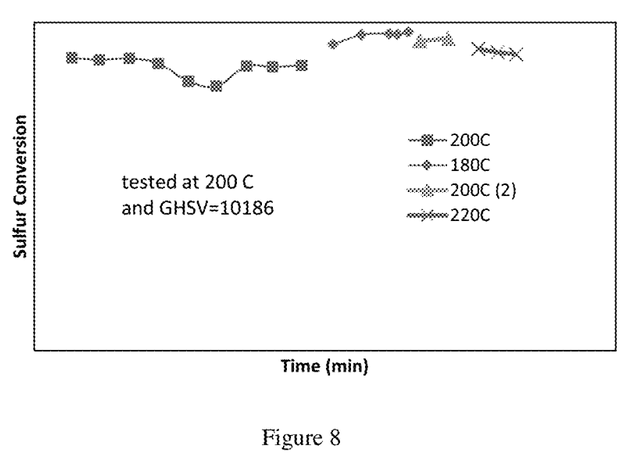
FIG. 8 is a graph showing $H_2S$ conversion as a function of temperature for $FeCl_2$/$CeO_2$—$Al_2O_3$ at GHSV of 10186 hr$^{-1}$. The test was conducted initially at 200° C. with 4000 ppmv $H_2S$ in $H_2$—$CO_2$ mixture.

The catalyst $FeCl_2/CeO_2$—$Al_2O_3$ was evaluated for percent sulfur conversion as a function of temperature. The catalyst was tested with 4000 ppmv $H_2S$ in $H_2$—$CO_2$—$N_2$. The GHSV was 10186 hr⁻¹. The initial temperature was at 200° C. The temperature was decreased to 180° C. and then increased to 200° C. and 220° C. The results are shown in FIG. 8.

At this high GHSV, the catalyst maintained a high conversion of 0.8-0.94 with the significant temperature variation. The data suggests that this catalyst formulation has good temperature tolerance.

Example 9. Manganese (II) Chloride Based Catalyst

Figure 9:
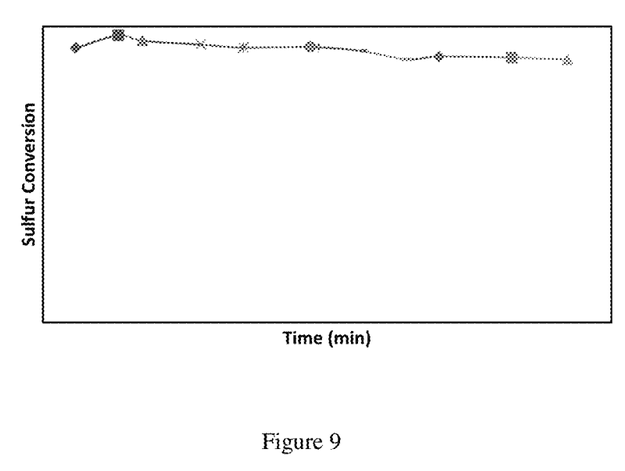
FIG. 9 is a graph showing $H_2S$ conversion for $MnCl_2$/$CeO_2$—$Al_2O_3$ at 200° C. and GHSV of 1000 hr$^{-1}$. The test was conducted with 4000 ppmv $H_2S$ in $H_2$—$CO_2$ mixture.

The catalyst $MnCl_2/CeO_2$—$Al_2O_3$ was evaluated for $H_2S$ oxidation. The catalyst was tested with 4000 ppmv $H_2S$ in $H_2$—$CO_2$—$N_2$. The GHSV was 1000 hr⁻¹. The temperature was at 200° C. The results are shown in FIG. 9. $MnCl_2$ demonstrated a very stable and high conversion of 0.88-0.97 during the test.

We claim:

1. A method for removing sulfur-containing compounds from a fluid fuel stream, the method comprising (a) contacting the fluid fuel stream with a catalyst in the presence of an oxygen-containing gas,
   wherein the catalyst comprises one or more substrates and one or more reactive metal salts, and wherein the metal in the one or more reactive metal salts is in its lowest possible oxidation state,
   wherein step (a) occurs under conditions in which greater than 70% of the sulfur-containing compounds convert to elemental sulfur in the gaseous state,
   wherein the one or more reactive metal salts are selected from the group consisting of chlorides of transition metals having multiple oxidation states, sulfates of transition metals having multiple oxidation states, and combinations thereof, and
   wherein the method does not involve a Claus reaction.

2. The method of claim 1, wherein the oxygen-containing gas is selected from the group consisting of oxygen, air, ozone, hydrogen peroxide, and combinations thereof.

3. The method of claim 1, wherein the fluid fuel stream has a sulfur content of 4% vol. or less, prior to contacting the catalyst.

4. The method of claim 1, wherein the fluid fuel stream is a gaseous fuel stream selected from the group consisting of land fill gases, natural gas from natural gas wells, flammable gases from oil wells, flammable gases from tar sands, syngas, and flare gas.

5. The method of claim 1, wherein the sulfur-containing compounds are selected from the group consisting of $H_2S$, $CS_2$, mercaptans, thiols, COS, and combinations thereof.

6. The method of claim 1, wherein oxygen to sulfur atomic ratio inside the fluid fuel stream is from about 1 to about 100, prior to contacting the catalyst.

7. The method of claim 1, wherein the fluid fuel stream contacts the catalyst at a temperature from about 160° C. to about 300° C., wherein an oxidized state of the catalyst converts sulfur-containing compounds to elemental sulfur.

8. The method of claim 7, wherein the temperature is from about 180° C. to about 250° C.

9. The method of claim 1, wherein less than 5% of sulfur species are converted to $SO_2$.

10. The method of claim 1, wherein the method has a single pass conversion of from about 80% to about 99%.

11. The method of claim 1, wherein the method has a conversion rate of at least 80% at a gas hourly space velocity (GHSV) of 500-15,000 hr⁻¹ or a resident time of 0.24-7.2 seconds.

12. The method of claim 1, further comprising passing the fluid fuel stream through a sorbent material, a scrubber, or other sulfur removal materials or systems to remove remaining sulfur-containing compounds.

13. The method of claim 12, wherein following the passing step, the amount of remaining sulfur-containing compounds is from about 1 ppm to about 0.1 ppm.

14. The method of claim 1, wherein the one or more substrates comprise a metal oxide or mixed metal oxides.

15. The method of claim 14, wherein the metal oxide or mixed metal oxides are selected from the group consisting of aluminum oxide, titanium dioxide ($TiO_2$), silicon dioxide ($SiO_2$), and combinations thereof.

16. The method of claim 1, wherein the one or more metal salts are selected from the group consisting of CuCl, $MnCl_2$, $MnSO_4$, $FeCl_2$, $FeSO_4$, $NiCl_2$, $NiSO_4$, and combinations thereof.

17. The method of claim 1, wherein the one or more metal salts are present in an amount from about 1% to about 20% by weight of the catalyst.

18. The method of claim 1, wherein the one or more substrates comprise one or more metal oxides in an amount from about 80% to about 99% by weight of the catalyst.

19. The method of claim 1, wherein the catalyst further comprises a compound which is an oxygen sponge.

20. The method of claim 19, wherein the compound is a lanthanide oxide.

21. The method of claim 20, wherein the compound is cerium oxide.

22. The method of claim 19, wherein the compound is magnesium oxide and/or nickel oxide.

23. The method of claim 19, wherein the compound is present in an amount of about less than 10% by weight of the catalyst.

24. The method of claim 19, wherein the compound is present in an amount from about 2% to about 7% by weight of the catalyst.

25. The method of claim 1, wherein the metal ions are oxidized to the next higher oxidation state by oxygen in the oxygen-containing gas at a temperature in the range of 100-300° C.; and
   wherein the metal ions at the higher oxidation state oxidize molecules containing one or more —SH groups to form elemental sulfur.

26. The method of claim 25, wherein the molecules containing one or more —SH groups are selected from the group consisting of $H_2S$ and mercaptans.

27. The method of claim 1, wherein in step (a) less than 5% of the sulfur-containing compounds are converted to sulfur dioxide.

* * * * *